(12) United States Patent
Mittelstadt

(10) Patent No.: US 7,722,122 B2
(45) Date of Patent: May 25, 2010

(54) PORTABLE SUPPORT INCLUDING A PILLOW

(76) Inventor: John Mittelstadt, 20 Val Vista Rd., Mill Valley, CA (US) 94941

( * ) Notice: Subject to any disclaimer, the term of this patent is extended or adjusted under 35 U.S.C. 154(b) by 0 days.

(21) Appl. No.: 12/316,061

(22) Filed: Dec. 9, 2008

(65) Prior Publication Data

US 2009/0205136 A1 Aug. 20, 2009

Related U.S. Application Data

(63) Continuation-in-part of application No. 12/152,591, filed on May 15, 2008.

(60) Provisional application No. 60/962,347, filed on Jul. 28, 2007.

(51) Int. Cl.
*A47C 7/62* (2006.01)

(52) U.S. Cl. .......................... 297/397; 297/464; 5/640; 5/657

(58) Field of Classification Search ................. 297/397, 297/464, 482, 483, 485; 5/640, 657
See application file for complete search history.

(56) References Cited

U.S. PATENT DOCUMENTS

| | | | | |
|---|---|---|---|---|
| 247,823 | A * | 10/1881 | Hiller | 297/395 |
| 3,608,964 | A * | 9/1971 | Earl | 297/397 |
| 4,097,086 | A * | 6/1978 | Hudson | 297/217.1 |
| 4,394,783 | A * | 7/1983 | Simmons | 297/230.1 |
| 4,815,154 | A * | 3/1989 | Grimes | 5/657 |
| 5,317,772 | A | 6/1994 | Perl et al. | |
| 5,345,633 | A * | 9/1994 | Harnish | 5/639 |
| 5,471,690 | A | 12/1995 | McNeil | |
| 5,544,378 | A | 8/1996 | Chow | |
| 6,017,094 | A | 1/2000 | Syiek | |
| 6,086,152 | A * | 7/2000 | Zeller | 297/284.5 |
| 6,126,237 | A * | 10/2000 | Ritterhouse | 297/397 |
| 6,394,554 | B1 | 5/2002 | Hingle | |
| 6,484,335 | B2 * | 11/2002 | Gilbert | 5/636 |
| 6,592,184 | B1 | 7/2003 | Segal et al. | |
| 6,641,221 | B1 | 11/2003 | Kastlunger | |
| 6,684,429 | B1 | 2/2004 | Deering | |
| 6,708,355 | B1 | 3/2004 | Wang et al. | |
| 6,793,287 | B2 * | 9/2004 | Dunk | 297/397 |
| 6,942,297 | B2 | 9/2005 | Johnson | |
| D522,300 | S | 6/2006 | Roberts | |
| D534,389 | S | 1/2007 | Chisholm et al. | |
| 7,490,909 | B1 * | 2/2009 | Haggman et al. | 297/397 |
| 2002/0163240 | A1 | 11/2002 | Cheng | |
| 2007/0056111 | A1 | 3/2007 | Lastman | |
| 2007/0180623 | A1 | 8/2007 | Stein et al. | |
| 2007/0209115 | A1 | 9/2007 | Carroll | |

FOREIGN PATENT DOCUMENTS

GB 2 440 906 2/2008

* cited by examiner

*Primary Examiner*—Peter R. Brown
(74) *Attorney, Agent, or Firm*—Thomas R. Lampe

(57) ABSTRACT

A portable support for supporting the head of a seated individual including an elongated pillow and a flexible retention member having fasteners enabling the flexible retention member to assume different loop configurations enabling the portable support to alternatively be connected to an upper seat corner or be supported by the individual.

7 Claims, 2 Drawing Sheets

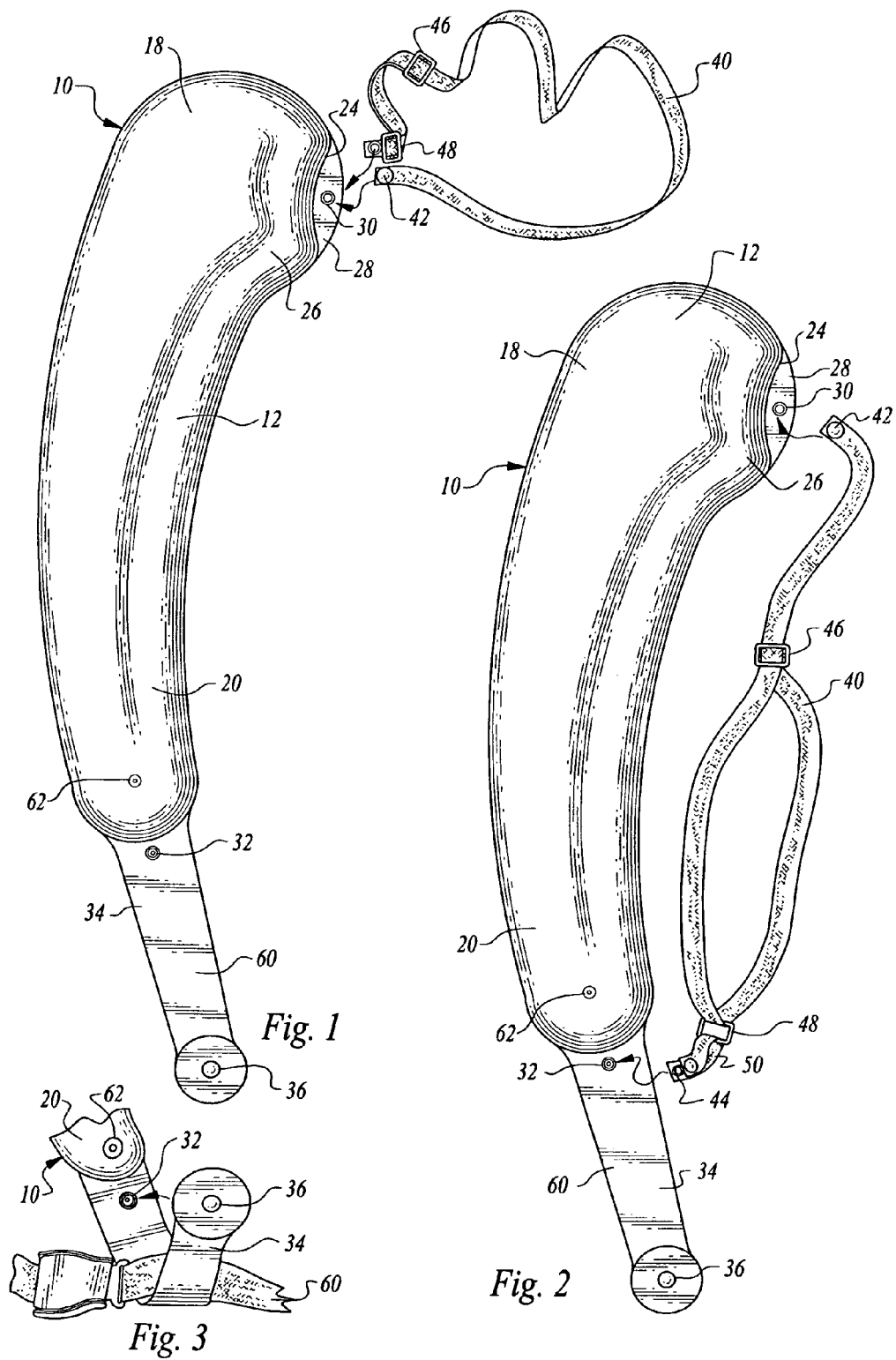

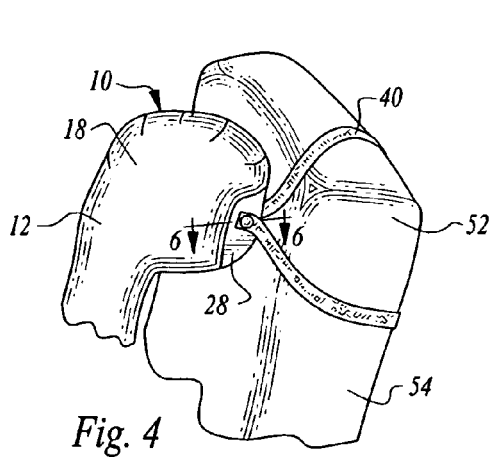
Fig. 4
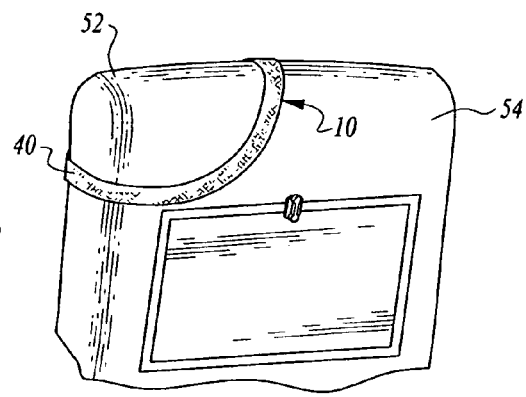
Fig. 5
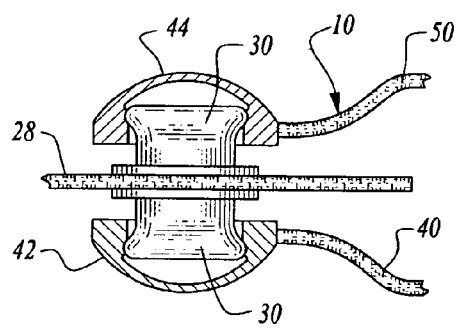
Fig. 6
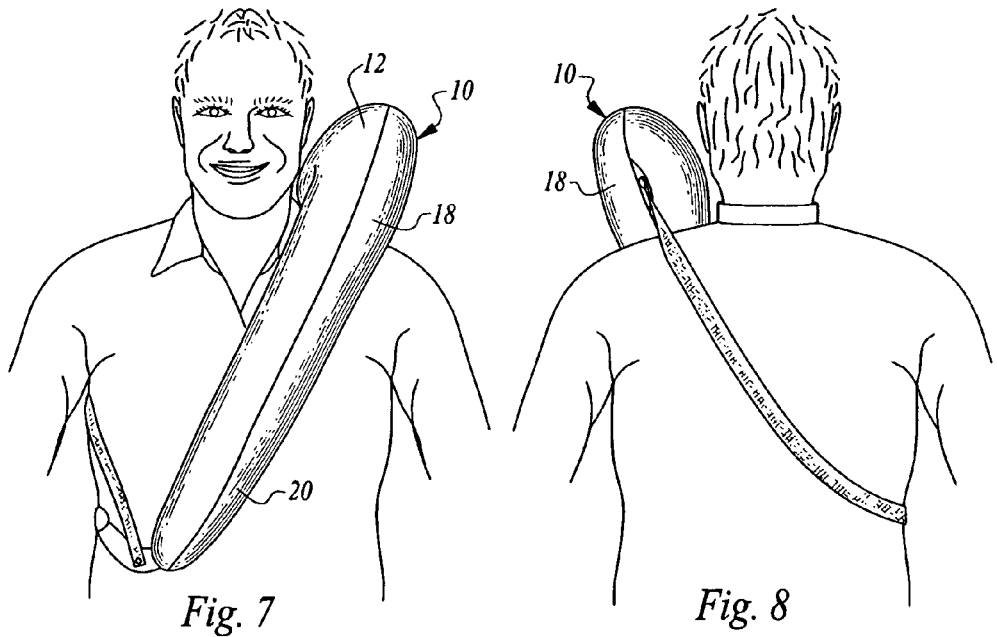
Fig. 7
Fig. 8

PORTABLE SUPPORT INCLUDING A PILLOW

This Application is a continuation-in-part application of U.S. patent application Ser. No. 12/152,591 filed date May 15, 2008 which claimed the benefit of U.S. Provisional Patent Application Ser. No. 60/962,347, filed Jul. 28, 2007.

TECHNICAL FIELD

This invention relates to a portable support including a pillow for providing support for a seated individual. The support is particularly, although not exclusively, for positioning against the head of a person when traveling on an airplane, train or bus or in an automobile. The portable support is useful in any situation wherein a seated individual wishes to rest his or her head.

BACKGROUND OF THE INVENTION

Portable travel pillows and head rests are known generally. Some of these devices are specifically devised to attach to the backs of seats to provide lateral support for the head of a seated person.

The following patent documents are believed to be representative of the current state of the prior art in this field: U.S. Pat. No. 6,592,184, issued Jul. 15, 2003, U.S. Patent App. Pub. No. US 2002/0163240, published Nov. 7, 2002, U.S. Patent App. Pub. No. US 2007/0056111, published Mar. 15, 2007, U.S. Patent App. Pub. No. US 2007/0180623, published Aug. 9, 2007, U.S. Pat. No. 5,317,772, issued Jun. 7, 1994, U.S. Pat. No. 5,471,690, issued Dec. 5, 1995, U.S. Pat. No. 5,544,378, issued Aug. 13, 1996, U.S. Pat. No. 6,641,221, issued Nov. 4, 2003, U.S. Pat. No. 6,684,429, issued Feb. 3, 2004, U.S. Pat. No. 6,708,355, issued Mar. 23, 2004, U.S. Pat. No. 6,942,297, issued Sep. 13, 2005, U.S. Patent App. Pub. No. US 2007/0209115, published Sep. 13, 2007, U.S. Pat. No. 6,017,094, issued Jan. 25, 2000, U.S. Pat. No. 6,394,554, issued May 28, 2002, U.S. Design Pat. No. D522,300, issued Jun. 6, 2006, U.S. Design Pat. No. D534,389, issued Jan. 2, 2007 and UK Patent App. GB 2 440 906, published Feb. 20, 2008.

DISCLOSURE OF INVENTION

The portable support of the present invention incorporates a number of unique features not taught or suggested by the known prior art and which add to the versatility and ease of use of the portable support. The portable support may alternatively be connected to an upper corner of a seat back to provide the desired support or be worn by the individual to provide the desired support. The portable support is characterized by its relative simplicity and ease of use. Its position relative to a seat and/or to an individual's body may be readily adjusted to provide the desired support for the user's head and upper body.

The portable support includes an elongated pillow having upper and lower pillow end portions, the upper pillow end portion being larger than the lower pillow end portion.

The portable support incorporates retention structure including an adjustably flexible retention member and a pair of spaced fasteners attached to the retention member.

First connector structure is located at the upper pillow end portion and second connector structure is located at the lower pillow end portion.

The retention structure is selectively adjustable to alternatively form either a first loop configuration wherein said retention member is wrapped at least partially about and engages the upper corner of a seat back or a second loop configuration wherein the retention member extends downwardly along and at least partially about the body of the individual, both of said fasteners of said pair of spaced fasteners being attached to the first connector structure when the retention member is in the first loop configuration, and one of the fasteners attached to the first connector structure and the other of the fasteners attached to the second connector structure when the retention member in the second loop configuration.

Other features, advantages and objects of the present invention will become apparent with reference to the following description and accompanying drawings.

BRIEF DESCRIPTION OF DRAWINGS

FIG. 1 is a front, elevational view of a portable support constructed in accordance with the teachings of the present invention prior to attachment of an adjustable, flexible retention member solely at the upper pillow end portion to form a first loop configuration;

FIG. 2 is a view similar to FIG. 1, but prior to attachment of the adjustable, flexible retention member at both the upper and lower pillow end portions to form a second loop configuration;

FIG. 3 is a perspective view showing selected portions of the portable support and the portable support being connected to a seat belt;

FIG. 4 is a perspective view illustrating the upper pillow portion attached by the retention member to an upper corner of a seat back, the retention member forming the first loop configuration;

FIG. 5 is a perspective view illustrating the rear of the upper seat back corner with the retention member in place;

FIG. 6 is a greatly enlarged, cross-sectional view illustrating two snap fastener elements of the flexible retention member attached to two snap fastener elements at the upper pillow end portion;

FIG. 7 is a front, perspective view illustrating the portable support worn by an individual, the flexible retention member forming the second loop configuration; and FIG. 8 is a view taken from the back of the individual wearing the portable support shown in FIG. 6.

BEST MODE FOR CARRYING OUT THE INVENTION

Referring now to FIGS. 1-8, a portable support constructed in accordance with the teachings of the present invention is designated by reference numeral 10. The portable support 10 has a number of features in common with the elongated pillow disclosed in my co-pending U.S. patent application Ser. No. 12/152,591, including an elongated pillow 12 which in the arrangement illustrated is constructed of flexible material and inflatable from a collapsed condition (not shown) to the inflated condition shown in the figures. Any suitable conventional means may be utilized to introduce air into the pillow or alternatively allow air to exit the pillow.

The elongated pillow has an upper or first pillow end portion 18 and a lower or second pillow end portion 20. The upper pillow end portion is larger than the lower pillow end portion, the pillow tapering inwardly in the direction of the lower pillow end portion. In addition, the elongated pillow has a curved configuration and the upper pillow end portion 18 projects laterally, as shown.

The upper pillow end portion defines an inwardly projecting recess 24 at the outer periphery thereof, and more particularly at an outwardly projecting shoulder engagement lobe 26 of the upper pillow end portion.

A flat connector tab 28 is in the recess. Two male snap fastener elements (gypsy studs) 30 are disposed in opposition to one another (see FIG. 6) and are attached to opposite sides of the connector tab. Together, the connector tab 28 and snap fastener elements 30 comprise first connector structure.

Second connector structure is located at said lower pillow end portion, being in the form of a gypsy stud or male snap fastener element 32 located on a flexible lower strap 34 extending downwardly from the lower pillow end portion. A second snap fastener element 36 is located at the distal end of lower strap 34.

The portable support also includes retention structure including an adjustable flexible strap 40 and a pair of female snap fastener elements 42, 44 attached to the strap 40 at spaced locations thereon. Strap 40 may be formed of any suitable material such as nylon. Fastener element 42 is attached near one of the strap ends. A ladder back type buckle or bracket 46 is sewn or otherwise secured to the other end of strap 40.

A D-loop bracket 48 is located on strap 40 which receives a flexible connector strip 50 secured at its ends by any suitable expedient such as cooperable male/female connectors (not shown). Female snap fastener element 44 is located on and projects outwardly from connector strip 50.

The effective length of flexible strap 40 may be readily adjusted to form a first loop configuration wherein it is wrapped partially about and engages an upper corner 52 of the seat back 54 of a seat such as an airplane passenger seat to retain the upper pillow head portion in position relative to the seat and occupant. This loop configuration is shown in FIGS. 1, 4 and 5. The ladder back bracket 46 allows strap and loop size adjustment and serves to releasably lock the strap when adjusted as desired. In this loop configuration the snap fastener elements 42, 44 are attached to the fastener elements 30.

The flexible lower strap 34 extending downwardly from the lower pillow end portion is employed to connect the lower pillow end portion to a seat belt 60 (FIG. 3) comprising part of the seat. The flexible lower strap 34 may be wrapped around the seat belt (as shown in FIG. 3) to connect the lower strap and lower pillow end portion to the seat to maintain the pillow along and in engagement with the user's body. The strap may be slid along the seat belt to adjust positioning of the lower pillow end portion. Snap fastener element 36 may be attached to a snap fastener element 62 located on lower pillow end portion to secure the flexible strap in place about the seat belt and provide additional support while sleeping.

Rather than use the flexible strap 40 to secure the elongated pillow to a seat back upper corner and use the lower strap 34 to provide an attachment with a seat belt, the retention member can be formed into a second loop configuration that enables the portable support to be essentially worn by an individual, as shown in FIGS. 7 and 8. The portable support forms an enclosed space when the female snap fastener element 42 is snapped together with one of the male snap fastener elements 30 and female snap fastener element 44 is attached to male snap fastener element 32. See FIG. 6. The space is of sufficient size to accommodate an upper body portion of the individual. The portable support surrounds the upper body portion and extends from a location above a shoulder of the individual with the elongated pillow 12 extending downwardly from a location above the shoulder either alongside or across the individual's chest. The upper or first pillow end portion can be positioned over either shoulder with the lobe 26 in engagement therewith, according to the wishes of the user.

The above described embodiment is intended to illustrate the principles of the invention, but not to limit its scope. Other embodiments and variations to these embodiments will be apparent to those skilled in the art and may be made without departing from the spirit and scope of the invention.

The invention claimed is:

1. A portable support for supporting the head of a seated individual and alternatively attachable to an upper corner of the back of a seat employed by the individual and depending from the upper corner or attachable to the individual and depending from the individual, said portable support comprising, in combination:

an elongated pillow having upper and lower pillow end portions, said upper pillow end portion being larger than said lower pillow end portion;

retention structure including an adjustable, flexible retention member and a pair of spaced fasteners attached to said retention member;

first connector structure at said upper pillow end portion; and second connector structure at said lower pillow end portion, said retention structure selectively adjustable to alternatively form either a first loop configuration wherein said retention member is wrapped at least partially about and engages said upper corner or a second loop configuration wherein said retention member extends downwardly along and at least partially about the body of the individual, both of said fasteners of said pair of spaced fasteners being attached to said first connector structure when said retention member is in said first loop configuration, and one of said fasteners attached to said first connector structure and the other of said fasteners attached to said second connector structure when said retention member is in said second loop configuration.

2. The portable support according to claim 1 wherein said retention member comprises a flexible strap, said fasteners attached to said strap.

3. The portable support according to claim 2 additionally comprising at least one loop size adjustment bracket connected to said flexible strap for releasably adjusting said flexible strap and locking said flexible strap in either said first loop configuration or in said second loop configuration.

4. The portable support according to claim 2 wherein said first connector structure includes at least one snap fastener element, said second connector structure includes at least one snap fastener element, and at least one of said fasteners attached to said strap comprises a strap snap fastener element selectively alternatively engageable with the snap fastener elements of said first and second connector structures.

5. The portable support according to claim 4 wherein a connector bracket is connected to said strap, the strap snap fastener element selectively alternatively engageable with the snap fastener elements of the first and second connector structures being located on a connector strip secured to the connector bracket.

6. The portable support according to claim 4 wherein said upper pillow end portion includes a shoulder engagement lobe and defines an inwardly projecting recess at the outer periphery thereof, said first connector structure additionally including a connector tab in said recess, the at least one snap fastener element of said first connector structure located on said connector tab.

7. The portable support according to claim 6 wherein said first connector structure comprises a pair of snap fastener elements, the snap fastener elements of said pair of snap fastener elements disposed on opposite sides of said connector tab.

* * * * *